June 21, 1966  V. L. HARDY  3,256,764
RULE CUTTING DEVICE

Original Filed May 31, 1962  2 Sheets-Sheet 1

INVENTOR
VINCENT L. HARDY
BY Jack N. McCarthy
AGENT

June 21, 1966  V. L. HARDY  3,256,764
RULE CUTTING DEVICE
Original Filed May 31, 1962  2 Sheets-Sheet 2
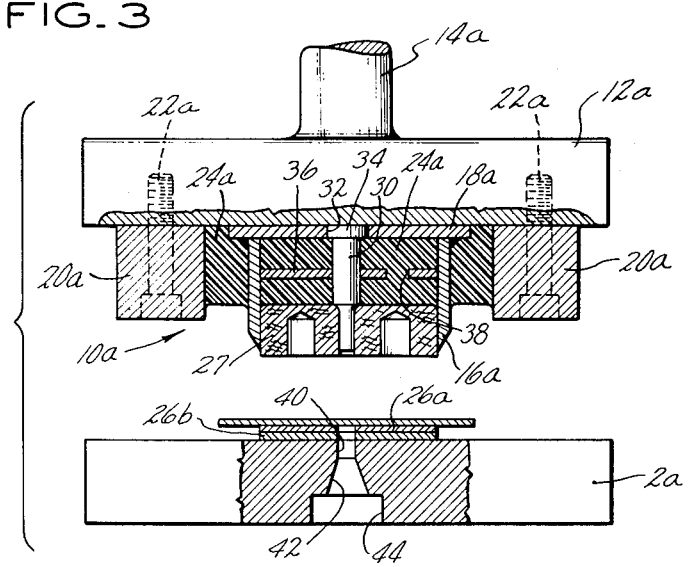
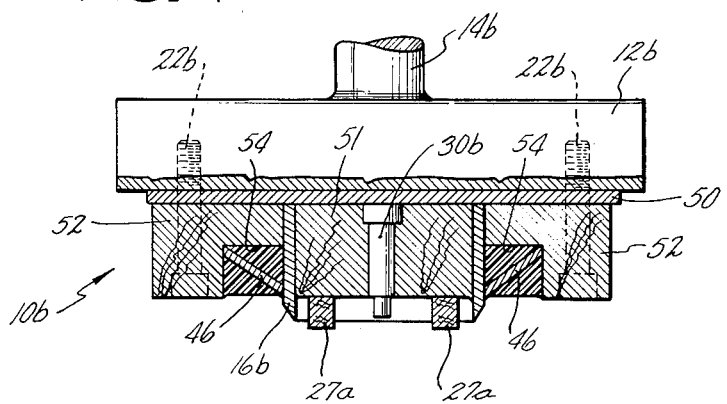
INVENTOR
VINCENT L. HARDY
BY Jack N. McCarthy
AGENT

United States Patent Office 3,256,764
Patented June 21, 1966

3,256,764
RULE CUTTING DEVICE
Vincent L. Hardy, Stratford, Conn., assignor to United Aircraft Corporation, East Hartford, Conn., a corporation of Delaware
Original application May 31, 1962, Ser. No. 199,007, now Patent No. 3,212,365, dated Oct. 10, 1965. Divided and this application July 2, 1965, Ser. No. 469,274
8 Claims. (Cl. 83—690)

This invention relates to a device for cutting sheet material into desired shapes. This application is a division of application Serial No. 199,007, filed May 31, 1962, now Patent No. 3,212,365, to Vincent L. Hardy.

An object of this invention is to provide a rule cutting die which can be made without the precision cutting needed for its construction by known fabricating means using only wood supporting structure.

Another object of this invention is to provide a rule cutting die having an extended life.

A further object of this invention is to provide a rule cutting die which maintains its accuracy throughout its usage.

Another object of this invention is to provide a rigid rule cutting device having a rule held within a supporting edge by hardened plastic.

Other objects and advantages will be observed from a reading of the specification and the claims in connection with the drawings.

FIGURE 3 is a side view similar to FIGURE 1 through a press showing another modification of the cutting device.

FIGURE 4 is a side view showing another modification of the upper half of the cutting device.

Figure 1:
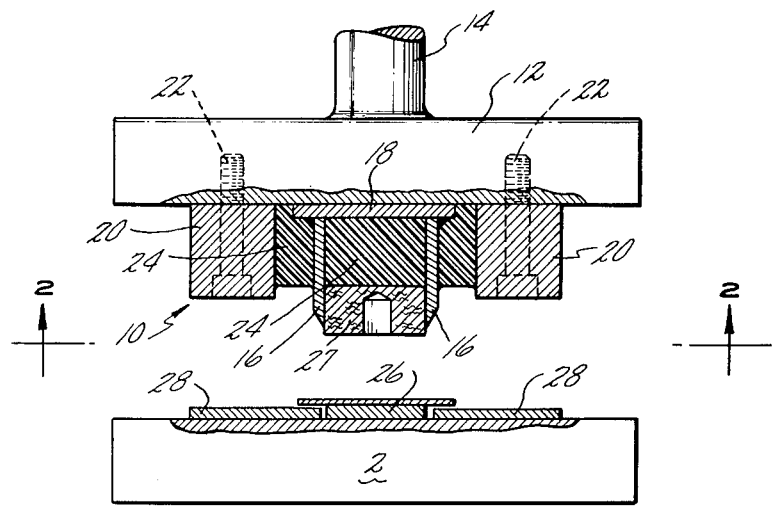
FIGURE 1 is a side view of a press, partially in section, showing the cutting device in section attached thereto.
Figure 2:
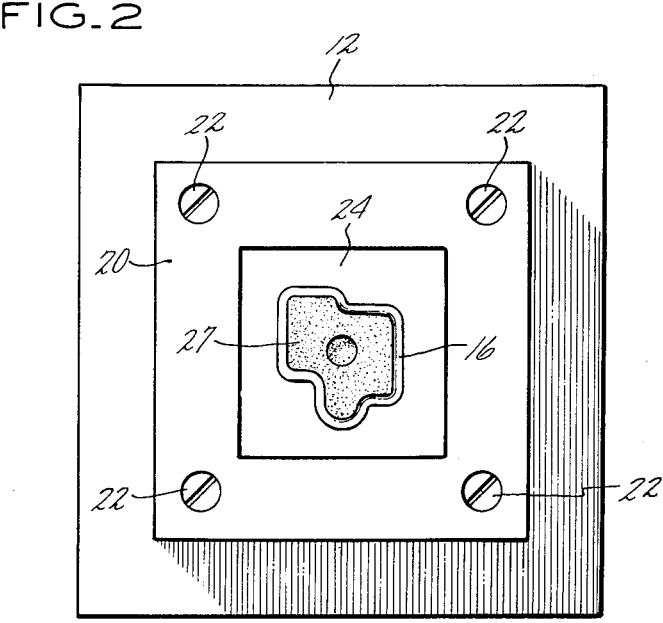
FIGURE 2 is a view taken along the line 2—2 of FIGURE 1 showing the bottom of the upper half of the cutting device and press.

Referring to FIGURE 1 of the drawings, the upper portion of rule cutting die 10 of the cutting device is fixed to the upper plate 12 of a press which is movable by the arm 14. Arm 14 lowers and raises the upper portion 10 a predetermined distance to place it in a desired position with relation to a base plate 2 of the press.

The upper portion of the cutting device is fabricated by bending a metal rule 16 to a desired outline and welding it to a rigid metal backing plate 18. For some applications the rule is held in place on the backing plate during fabrication. This unit is placed on a flat surface and surrounded by a supporting fence, or retaining edge member, 20. This fence 20 does not come in contact with the rule 16 or backing plate 18. The height of the fence or retaining edge member 20 is less than the combined height of the thickness of the backing plate 18 and height of the rule 16 to prevent any interference between the edge of the fence 20 and either the workpiece or any part of the base plate 2 of the press.

When the two parts have been properly positioned, a hardening plastic 24 is poured in the space between the two parts. The hardening plastic is poured to a height which is approximately equal to the height of the fence 20. The interior of the rule 16 is also filled to the same height with the hardening plastic 24. When the plastic has hardened, the fabricated upper portion is loosened from the flat surface. The fence 20 is fixed to the upper plate 12 of the movable press by bolts 22 which have their heads recessed into the fence within a small countersunk hole.

In FIGURE 1, a male mating member 26 is fixed to the top of the base plate 2 of the press. This male mating member 26 is shaped to just fit within the desired outline of the rule 16. The male mating member can be formed by securing a plate to the base plate 2 of its press by suitable means, such as a tape having adhesive on both sides, and by being punched out by the upper portion 10 of the cutting device. The excess material can then be pried from the base plate 2 leaving the male mating member. When cutting soft materials, such as rubber, fabric, cork, asbestos and similar materials, the male mating member may be omitted. For blanking aluminum and material of similar strength, the member is used.

A stripper 28 can be used around the outer edge of the male mating member 26 to aid in picking up the remaining part of the work sheet. A stripper 27 is used within the area defined by the rule. This facilitates the removal of die formed pieces. The stripper can be formed by the upper portion of the cutting device. The material of the stripper can be cork, rubber or any other like material. The stripper extends for a small distance above the edge of the rule. Holes can be cut in the stripper to facilitate the mating of the mating parts of the press. In large dies, small blocks 27a of stripper material may be fixed about the surface.

FIGURE 3 is similar to FIGURE 1 with the exception being that a punch 30 is used within the rule 16a. The rule 16a is bent to a desired outline and welded to a rigid metal backing plate 18a. This backing plate has an opening 32 which serves to position the punch 30. The punch 30 has an annular flange 34 which fits into the opening 32. The punch can also be further positioned for accuracy by the use of a metal insert 36 which has been cut to snugly fit the interior of rule 16a and the punch 30. A hole 38 is provided in the insert 36 to permit the plastic 24a to run into the space under the insert 36. The plastic is filled up to a point where the punch 30 is necked down to the desired diameter of the part to be punched.

It can be seen that if the punch 30 breaks, the remaining portion can be knocked out of the back after the upper portion of the cutting device has been removed from the upper plate 12a of the press. A new punch 30 can then be inserted and the upper portion 10a of the cutting device reaffixed in place on the upper plate 12a of the press.

The base plate 2a has a hole 40 therein into which the punched-out part of the work sheet drops. Wider openings 42 and 44 connect the bottom of hole 40 to the bottom of the base plate 2a so that the punched-out parts can drop through the base plate.

On the base plate 2a of the press, it is noted that two male mating members 26a and 26b are shown. This can be done to vary the height of the male mating portion. Also, when cutting steel and titanium, a more rigid male mating member is desired.

In FIGURE 4, the upper portion of the cutting device is fabricated by bending it to a desired shape and placing an inner solid member 51 which mates with the inner portion of the rule and placing an outer solid portion 52 around the rule which mates with the outer portion of the rule. The members 51 and 52 are of such a height which permits the cutting edge of the rule to project. A portion is cut from the outer member 52 immediately adjacent the rule for its entire periphery providing a trough 54 around the rule. Supporting members 46 are placed between a supporting point in the trough of the outer member and the rule to accurately position the cutting edge of the rule. When the exact contour is obtained, plastic is poured for the entire depth of the trough. A punch 30b is shown as similar to the punch in FIGURE 3. A plate 50 is shown backing up the upper portion 10b of the cutting device. This plate 50 can be used if there are cutouts or openings in the surface of the upper plate of the press.

The upper portion of the cutting device can be formed of only a backing plate 18, rule 16 and plastic 24 as shown in FIGURE 1. The backing plate 18 would be fixed to the upper plate 12 of the press. This type of upper portion would be used where rigid outer support of the rule is not needed.

It is to be understood that the invention is not limited to the figures herein shown and described, but may be used in other ways without departure from its spirit as defined in the following claims.

I claim:

1. A rule cutting device comprising a cutting rule with a cutting edge having a predetermined contour, said rule being fixedly attached to a plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, and a hardened plastic material located between the inner surface of said fence and the outer side of said rule and the portion of the plate projecting outwardly from the rule, said hardened plastic material being fixed to said fence, rule and plate where it contacts therein.

2. A rule cutting device comprising a cutting rule with a cutting edge having a predetermined contour, said rule being fixedly attached to a plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, and a hardened plastic material located between the inner surface of said fence and the outer side of said rule and the portion of the plate projecting outwardly from the rule, said hardened plastic material being fixed to said fence, rule and plate where it contacts therein, and a hardened plastic material located within said rule.

3. A rule cutting device comprising a cutting rule with a cutting edge having a predetermined contour, said rule being fixedly attached to a plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, a hardened plastic material located between the inner surface of said fence and the outer side of said rule and the portion of the plate projecting outwardly from the rule, said hardened plastic material being fixed to said fence, rule and plate where it contacts therein, said plate having a hole therethrough, said hole opening into the area surrounded by said cutting rule, a punch member having a base end and cutting end, said punch member having its base end positioned in said hole, said punch member extending for a length placing its cutting end in a plane with the cutting edge of said cutting rule, and a hardened plastic material located within said rule around said punch member.

4. A rule cutting device comprising a cutting rule with a cutting edge having a predetermined contour, a plate having two sides, said rule being fixedly attached to one side of said plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, a hardened plastic material located between the inner surface of said fence and the outer side of said rule and the portion of the plate projecting outwardly from the rule, said hardened plastic material being fixed to said fence, rule and plate where it contacts therein, said plate having a hole therethrough, said hole opening into the area surrounded by said cutting rule, a punch member having a base end and cutting end, said punch member having its base end positioned in said hole, said punch member extending for a length placing its cutting end in a plane with the cutting edge of said cutting rule, and a hardened plastic material located within said rule around said punch member, said base end of said punch member being larger than said cutting end so that it can only be moved in a direction towards the other side of said plate from said rule.

5. A rule cutting device comprising a cutting rule with a cutting edge having a predetermined contour, said rule being fixedly attached to a plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, a hardened plastic material located between the inner surface of said fence and the outer side of said rule and the portion of the plate projecting outwardly from the rule, said hardened plastic material being fixed to said fence, rule and plate where it contacts therein, said plate having a hole therethrough, said hole opening into the area surrounded by said cutting rule, a punch member having a base end and cutting end, said punch member having its base end positioned in said hole, said punch member extending for a length placing its cutting end in a plane with the cutting edge of said cutting rule, means spaced from said plate and extending to said punch for positioning said punch outwardly from said plate, and a hardened plastic material located within said rule and on both sides of said means.

6. A rule cutting device comprising a cutting rule with a cutting edge having a predetermined contour, said rule being fixedly attached to a plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, a hardened plastic material located between the inner surface of said fence and the outer side of said rule and the portion of the plate projecting outwardly from the rule, said hardened plastic material being fixed to said fence, rule and plate where it contacts therein, said plate having a hole therethrough, said hole opening into the area surrounded by said cutting rule, a punch member having a base end and cutting end, said punch member having its base end positioned in said hole, said punch member extending for a length placing its cutting end in a plane with the cutting edge of said cutting rule, a second plate fitted snugly within said cutting rule and around said punch for positioning said punch, and a hardened plastic material located within said rule and on both sides of said second plate.

7. A rule cutting device comprising a cutting rule with a cutting edge having a predetermined contour, said rule being fixedly attached to a plate with said cutting edge extending away therefrom, said plate extending across the enclosed area at the end of said rule away from the cutting edge with a portion projecting outwardly from the rule, a fence located around the edge of said plate and having its lower edge on a plane with the bottom of said plate, said fence extending from the bottom of said plate to a point short of the cutting edge of the cutting rule fixed to said plate, a hardened plastic material located between the inner surface of said fence and the outer side of said rule and the portion of the plate projecting outwardly from the rule, said hardened plastic material being fixed to said fence, rule and plate where it contacts therein, said plate having a hole therethrough, said hole opening into the area surrounded by said cutting rule, a punch member having a base end and smaller cutting end, said punch member having its base end positioned in said hole, said punch member extending for a length placing its cutting end in a plane with the cutting edge of said cutting rule, means axially spaced from said plate along said punch member for positioning said punch against angular movement with respect to said plate, and a hardened plastic material located within said rule for preventing the axial movement of said punch member in a direction outwardly therefrom.

8. A rule cutting device comprising a cutting rule with a cutting edge having a predetermined contour, an inner solid member located within the rule and extending from the bottom of the rule to a point adjacent the cutting edge, an outer solid member located outside of said rule and extending from the bottom of the rule to a point adjacent the cutting edge, a groove located in said outer solid member adjacent the outer periphery of the cutting rule on the side nearest the cutting edge, supporting members each placed between a supporting point in said groove and the cutting rule to maintain it firmly against the inner solid member, a hardened plastic material filling said groove to fix said supporting members and said cutting rule in place, said hardened plastic material being fixed to said cutting rule, outer solid member, and supporting members.

References Cited by the Examiner

UNITED STATES PATENTS

| 3,046,815 | 7/1962 | Moe | 76—107 |
| 3,108,327 | 10/1963 | Phillips et al. | 76—107 |
| 3,119,312 | 1/1964 | Hinc | 83—347 X |
| 3,166,968 | 1/1965 | Krouskop | 83—681 |

OTHER REFERENCES

Cerromatrix Manual, publication of Cerro de Pasco Copper Corp. (copyright 1939), pp. 20–21.

ANDREW R. JUHASZ, *Primary Examiner.*

WILLIAM W. DYER, JR., *Examiner.*

L. B. TAYLOR, *Assistant Examiner.*